United States Patent
Todd

(10) Patent No.: US 7,930,330 B2
(45) Date of Patent: Apr. 19, 2011

(54) SCALED EXPONENTIAL SMOOTHING

(75) Inventor: Stephen James Todd, Winchester (GB)

(73) Assignee: International Business Machines Corporation, Armonk, NY (US)

( * ) Notice: Subject to any disclaimer, the term of this patent is extended or adjusted under 35 U.S.C. 154(b) by 1611 days.

(21) Appl. No.: 11/225,149

(22) Filed: Sep. 13, 2005

(65) Prior Publication Data

US 2006/0056721 A1    Mar. 16, 2006

(30) Foreign Application Priority Data

Sep. 14, 2004 (GB) .................. 0420367.5

(51) Int. Cl.
*G06F 15/00* (2006.01)
*G06F 7/38* (2006.01)

(52) U.S. Cl. ..................... 708/200; 708/445

(58) Field of Classification Search .......... 708/445, 708/200, 455
See application file for complete search history.

(56) References Cited

U.S. PATENT DOCUMENTS

| | | | |
|---|---|---|---|
| 6,782,297 B2 * | 8/2004 | Tabor | 700/55 |
| 7,020,791 B1 * | 3/2006 | Aweya et al. | 713/400 |
| 7,301,903 B2 * | 11/2007 | Brady | 370/230 |
| 7,574,382 B1 * | 8/2009 | Hubert | 705/27 |

* cited by examiner

*Primary Examiner* — Chuong D Ngo
(74) *Attorney, Agent, or Firm* — DeLizio Gilliam, PLLC

(57) ABSTRACT

A method and system for scaled exponential smoothing are provided. Multiple exponentially smoothed values are maintained for items and events occur on one or more of the items. The method maintains a gradually inflated representation of the smoothed values of items, such that the representation at a given time for an item where no event has occurred is not altered. Using a scaling technique enables the smoothed values for the objects on which an event has not occurred to remain the same. This reduces the number of calculations required significantly, enabling the use of the smoothing technique in a wide range of applications.

6 Claims, 2 Drawing Sheets

SCALED EXPONENTIAL SMOOTHING

FIELD OF THE INVENTION

This invention relates to the collection of statistical summary information that may be used to control computer system behavior or to provide a forecast of future computer system behavior. In particular, this invention relates to an improved method of exponential smoothing.

BACKGROUND OF THE INVENTION

Exponential smoothing is a form of statistical summary gathering that takes a previous period's summary and adjusts it up or down based on what actually occurred in that period. This is carried out by calculating a weighted moving average of the two values.

In computer system technology, it is often required to keep track of some smoothed usage/frequency statistic on a set of objects. For example, such techniques are useful in caching, scheduling, and data compression. As a specific example, there may be activity on a plurality of queues and it may be advantageous to monitor and determine the relative activity of the queues in order to allocate resources such as processor time or memory capacity. Maintaining a history of the activity in a time period for analysis requires a high level of processor and storage capacity. Therefore, a statistical summary method is used to adapt a summary based on the activity.

In the following description, the notation { } (as in $v\{t\}$) is used herein to indicate the value of a variable v at time t. In an implementation, these values will be simple variables that are overwritten as time progresses.

Similarly, the notation [ ] (as in $S[i]$) is used to indicate multiple values stored at once and discriminated by [i], possibly in an array or possibly in some other mechanism. For example, if $S[i]$ indicates activity on a queue, then [i] will represent each queue: the S data may be stored as a field in each queue.

Exponential smoothing provides a common and cheap way to smooth a single statistic. For example, when new value $v\{t\}$ arrives at time t, the smoothed value $S\{t\}$ is changed by using the following formula:

$S\{t\}=k*S\{t-1\}+(1-k)*v\{t\}$ where $k$ is a weighting factor between 0 and 1, typically in range 0.9 to 0.999. Formula 1

The smoothed value $S\{t\}$ is the summary value at time t. This is equal to the smoothed value $S\{t-1\}$ at the previous time t−1 multiplied by the weighting factor k, plus the actual value at time t multiplied by 1−k.

There are variations to this formula but the principle remains the same. For example, variations include whether elapsed time between events is allowed for and whether an event has a 'value'.

In the applications of caching, scheduling or data compression, there is a set of statistics to maintain. For example, the set of statistics may be for objects [1], [2], etc, or queues [myQueue], [hisQueue], etc. Typically, relative values are of interest. Thus, to keep all relative values in sync, when event value $v[i]\{t\}$ arrives for object [i] at time t, the formula for exponential smoothing can be written as follows:

$S[i]\{t\}=k*S[i]\{t-1\}+(1-k)*v[i]\{t\}$ $S[j]\{t\}=k*S[j]\{t-1\}$ for all objects [j] where $j!=i$ (j does not equal i) Formula 2

Using the example of the queues, if there is an event on queue [i], the summary for the queue will change by an exponential increase as there is an increase in the probability of activity on queue [i]. All the other queues [j] will have their summary changed by a corresponding exponential decay, as there is a decrease in the probability of activity on these other queues [j].

The cost of the update to $S[j]$ for all other objects on which an event has not occurred is clearly undesirable. There may be a high number of objects and the update of the summary for each of the objects limits the scalability of the statistical summary method. This can be mitigated by careful coding, but it remains a problem.

Applying exponential smoothing to large quantities of data results in a very high number of calculations that are not necessary until the time when an actual metric is required. It is an aim of the present invention to reduce the number of calculations required while providing an exponential smoothing technique.

SUMMARY OF THE INVENTION

According to a first aspect of the present invention there is provided a method where multiple exponentially smoothed values are maintained for items and events occur on one or more of the items. The method maintains a gradually inflated representation of the smoothed values of items, such that the representation at a given time for an item where no event has occurred is not altered.

In a preferred embodiment, the gradually inflated representation is scaled by the inverse of the exponential smoothing weighting factor.

Where only comparative item values are required, the representation may be used directly in a comparison of item values. Alternatively, where precise smoothed values are required, the method may maintain an indication of the inflation of the representation and may compute the standard smoothed value by dividing the inflated representation of the smoothed value by the indication of the degree of inflation.

Where actual probabilities are required for each of the items, the sum over the representation of the smoothed values of the items may be kept to 1, at each given time.

The method may iterate to provide smoothed values of items at regular intervals of time and the gradually inflated representation is scaled at a constant scale for each iteration. Alternatively, the method may iterate to provide smoothed values of items at irregular intervals of time and the gradually inflated representation may be scaled by a scale which varies depending on the time interval. The scale may be the inverse of a constant for each time interval.

As examples, the method may be used for resource allocation in a computer system or in a compression algorithm. In a computer system, the resources may be processor time, memory, etc. In a compression algorithm, the resource may be code space; ensuring that situations predicted as likely are coded using less code space (e.g. fewer bits) than situations predicted as unlikely.

According to a second aspect of the present invention there is provided a system where multiple exponentially smoothed values are maintained for items and events occur on one or more of the items; the system comprising means for maintaining gradually inflated representation of the smoothed values of items, such that the representation at a given time for an item where no event has occurred is not altered.

In a preferred embodiment, the gradually inflated representation is scaled by the inverse of the exponential smoothing weighting factor.

Where only comparative item values are required, the representation may be used directly in a comparison of item values. Alternatively, where precise smoothed values are required, the means may maintain an indication of the inflation of the representation and may compute the standard smoothed value by dividing the inflated representation of the smoothed value by the indication of the degree of inflation.

Where actual probabilities are required for each of the items, the sum over the representation of the smoothed values of the items may be kept to 1, at each given time.

The means may iterate to provide smoothed values of items at regular intervals of time and the gradually inflated representation is scaled at a constant scale for each iteration. Alternatively, the means may iterate to provide smoothed values of items at irregular intervals of time and the gradually inflated representation is scaled by a scale which varies depending on the time interval. The scale may be the inverse of a constant for each time interval.

As examples, the system may provide resource allocation in a computer system or a compression algorithm. In a computer system, the resources may be processor time, memory, etc. In a compression algorithm, the resource may be code space; ensuring that situations predicted as likely are coded using less code space (e.g. fewer bits) than situations predicted as unlikely.

According to a third aspect of the present invention there is provided a computer program product stored on a computer readable storage medium where multiple exponentially smoothed values are maintained for items and events occur on one or more of the items, comprising computer readable program code means for maintaining a gradually inflated representation of the smoothed values of items, such that the representation at a given time for an item where no event has occurred is not altered.

BRIEF DESCRIPTION OF THE DRAWINGS

Embodiments of the present invention will now be described, by way of examples only, with reference to the accompanying drawings in which.

DETAILED DESCRIPTION

The described method and system provide a technique to scale all values with an exponentially increasing scale. By using an increasing scale for smoothing iterations and not requiring that all the smoothing summaries add up to a constant amount, the computation costs in using exponential smoothing can be considerably reduced.

Using the same notation as for Formulas 1 and 2, when event value $v[i]\{t\}$ arrives for [i] at time t, the following formula is applied:

$scale\{t\}=k1*scale\{t-1\}$, where $k1=1/k$ $S'[i]\{t\}=S'[i]\{t-1\}+k2*v[i]\{t\}$, where $k2=(1-k)/k$ $S'[j]\{t\}=S'[j]\{t-1\}$, where $j!=i$; i.e. do not touch $S'[j]$ on this iteration.   Formula 3

In other words, each smoothed value is gradually inflated at each iteration to give an inflated representation of the smoothed value. The smoothed value is inflated by a scale of 1/k (where k is between 0 and 1, typically between 0.9 and 0.99).

Figure 1:
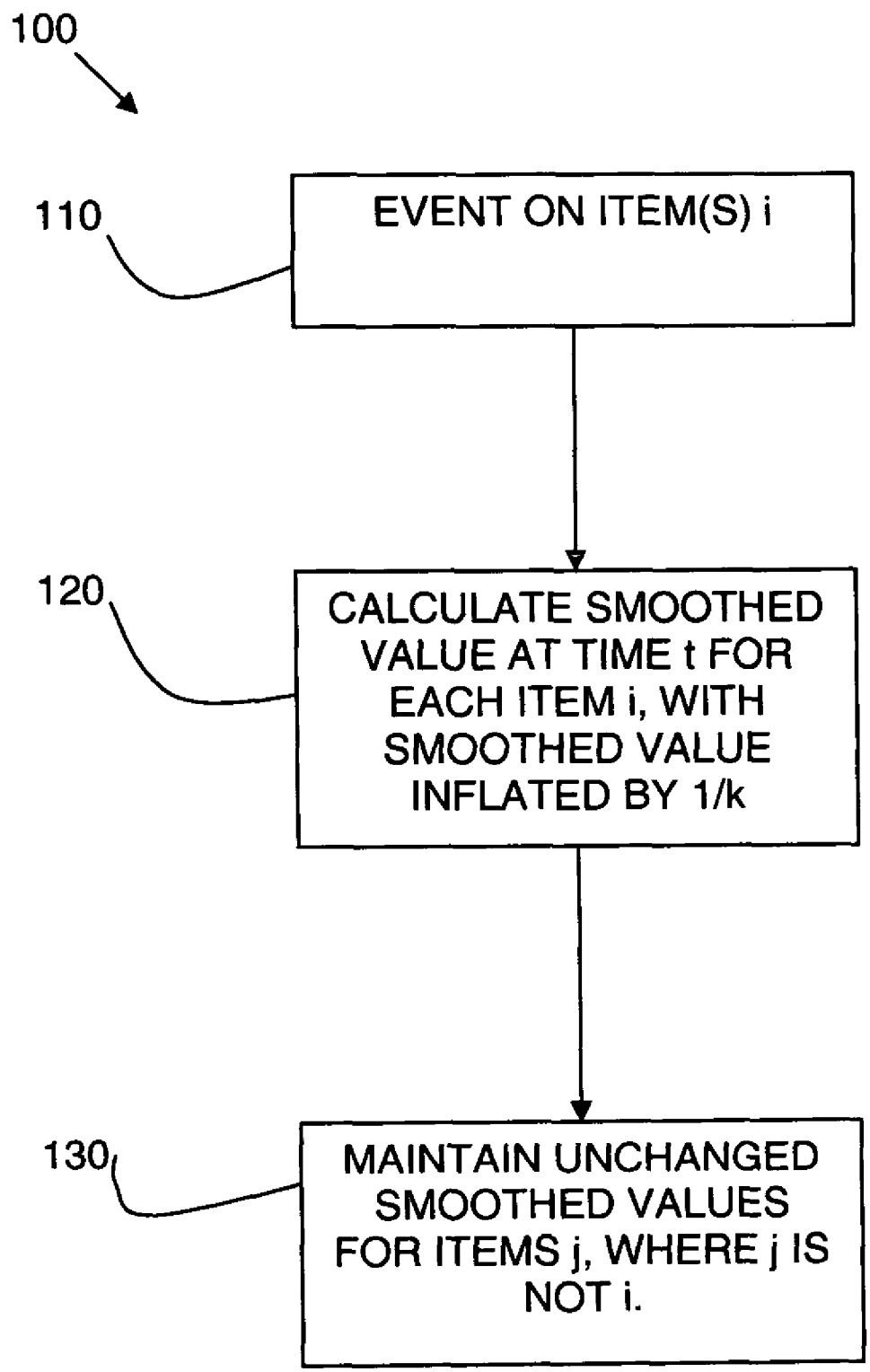
FIG. 1 is a flow diagram showing the steps of the method of exponential smoothing in accordance with the present invention.

Referring to FIG. 1, a flow diagram 100 is provided showing the steps of a smoothing algorithm for applying Formula 3. When an event occurs on item(s) [i] (step 110), the algorithm calculates (step 120) the smoothed value at time t for item(s) [i] inflated by scale 1/k. The algorithm maintains (step 130) the smoothed values for all the other items [k] on which an event has not occurred.

Using this scaling technique enables the smoothed values for the objects on which an event has not occurred to remain the same. This reduces the number of calculations required significantly, enabling the use of the smoothing technique in a wide range of applications.

The summary values $S'[i]\{t\}$ and $S'[j]\{t\}$ can be compared ignoring the scale$\{t\}$. Where the (original) absolute values are needed, they can be computed using the following formula.

$S[i]\{t\}=S'[i]\{t\}/scale\{t\}$.   Formula 3A

To prevent overflow, it is necessary periodically to rescale. For example, a rescale by an inverse power of 2 may be applied periodically.

$scale\{t\}=scale\{t\}/rescale$ $S'[i]\{t\}=S'[i]\{t\}/rescale$, for all [i]   Formula 4

A variation to the above technique may be provided to allow for recorded events at irregular intervals.

It is known in the art that if smoothing is required to give a history with damping based on time, rather than on number of recorded events, the basic formula changes. Rather than using a constant k for each event, a different value k{en} of k is used for each event e1, e2, ..., en, ...

Suppose a damping rate based on a constant k for each time interval (e.g. for each second) is required. Then for two consecutive events em, en at times tem, ten, the following formula is provided:

$k\{ten\}=K**(ten-tem)$   Formula 5 where K is the level of damping used per unit time interval, and is an absolute constant, and k{ten} is the level of damping appropriate when processing the event at time {ten}, allowing for the time elapsed {ten−tem} since the previous event.

This value of k then carries through Formulas 1 and 2, and into Formula 3, which becomes:

$scale\{ten\}=k1\{ten\}*scale\{tem\}$, where $k1\{ten\}=1/k\{ten\}$ $S'[i]\{ten\}=S'[i]\{tem\}+k2\{ten\}*v\{t\}$, where $k2\{ten\}=(1-k)/k\{ten\}$ $S'[j]\{ten\}=S'[j]\{tem\}$, where $j!=i$;   Formula 6 i.e. do not touch S'[j] on this iteration.

This variant is only appropriate where the events report discrete readings from a continuous value source, and not where the events report discrete activities.

If it is required to maintain the total through smoothing in order to provide exact probabilities, the following technique may be used.

If sum_over_j(S[j]{t−1})=1, then the S[j]{t−1} values represent estimated probabilities.

If there is an event at time t, v[i]{t}=1, then there is also: sum_over_j(S[j]{t})=1

The S values strictly represent probabilities, and not just relative probabilities. This is true whether S[j]{t} is computed using Formula 2, or Formulae 3 and 4.

Also in the case of event at time t, v[i]{t}=1, if $sum\_over\_j(S'[j]\{0\})=1$ scale{0}=1 then sum_over_j(S'[j]{t})=scale(t)

This preservation of total through the smoothing operations can help applications that use the smoothed statistics. In particular, applications may compute S[i]{t} using Formula 3A, and benefit from a knowledge that this computed value represents a true probability (e.g. that sum_over_j(S[j]{t})=1) without the need to compute S[j]{t} (j not equal to i), or the need to compute sum_over_j(S'[j]{t}).

Two example applications of the described smoothing technique are now provided. However, these are examples only and it will be appreciated that the technique has a wide range of possible applications and should not be construed as being limited in any way by the examples provided.

EXAMPLE 1

Resource Allocation

In a first example application, resources may be allocated based on activities. The relative activity may be desired to be monitored on many queues, programs, etc, so that server resources can be allocated according to that activity.

Figure 2:
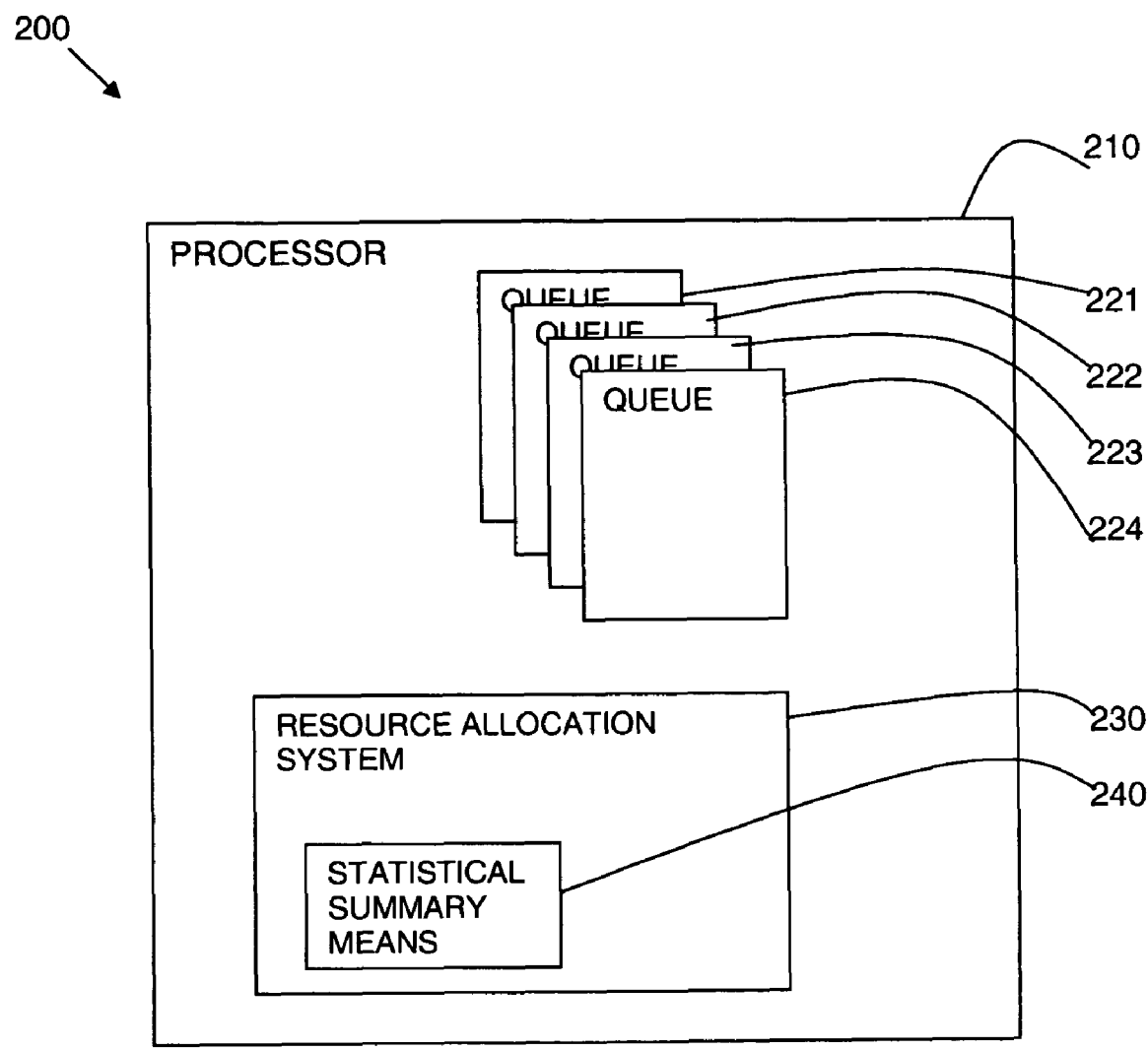
FIG. 2 is a block diagram of an embodiment of a system in which a method of exponential smoothing in accordance with the present invention may be applied.

Referring to FIG. 2, a block diagram is provided of an example embodiment of a system 200 in which the described method of exponential smoothing may be applied to give a statistical summary for resource allocation. The system 200 has a processor 210 with a plurality of queues 221, 222, 223, 224 running on it. A resource allocation system 230 is provided which uses a statistical summary means 240 based on the activities on the queues 221, 222, 223, 224 to determine the resources in the form of processor 210 capacity required for each of the queues 221, 222, 223, 224. The statistical summary means 240 uses the described scaled exponential smoothing technique to determine the relative amount of activity of the queues 221, 222, 223, 224.

In this case, each activity on a queue [i] at time {t} is recorded as an event value v[i]{t}. If all activities are of equal cost importance, then v[i]{t} will have the same value for each event (e.g. 1). If there is a weighting of activities by cost/importance, this may be reflected in appropriate values of v[i]{t}.

Note that Formula 3 and not Formula 5 is appropriate in this case. Using Formula 3, the values S'[i] give the relative activity on each queue.

EXAMPLE 2

Compression

A second example application is in compression algorithms. Compression algorithms work on the relative likelihood of different events (For example, the character E is more likely in the English language than the character Q).

Some algorithms (e.g. Morse code) use very static statistics/coding. However, some algorithms (e.g. arithmetic coding) can collect statistics dynamically and vary the coding accordingly.

In that case, the values S[i]{t} give the probabilities of each event (e.g. character i) as estimated at time {t}. If event i (character i) is observed at time t, the estimates S'[i]{t} are revised using Formula 3 with v[i]{t}=1.

The present invention is typically implemented as a computer program product, comprising a set of program instructions for controlling a computer or similar device. These instructions can be supplied preloaded into a system or recorded on a storage medium such as a CD-ROM, or made available for downloading over a network such as the Internet or a mobile telephone network.

Improvements and modifications can be made to the foregoing without departing from the scope of the present invention.

What is claimed is:

1. A computer program product for scaled exponential smoothing, the computer program product comprising a computer readable storage medium embodying computer program instructions, said instructions, when executed on a computer cause the computer to perform operations comprising:
   computing a first product of an inverse of a constant weighting factor and a difference between 1 and the constant weighting factor;
   computing a second product of the first product and an event value for an affected computing object at a first time;
   computing a smoothed value of the event value for the affected computing object at the first time as a sum of the second product and a preceding smoothed value of the affected computing object at a second time, wherein the second time precedes the first time;
   setting a smoothed value for an unaffected computing object at the first time to a preceding smoothed value of the unaffected computing object at the second time; and
   using a plurality of smoothed values for computing objects over a time period in a computing application, wherein the plurality of smoothed values includes the smoothed value for the affected computing object at the first time, the computing objects include the affected computing object and the unaffected computing object, and the time period includes the first time and the second time.

2. The computer program product of claim 1, wherein the operations further comprise maintaining a set of scale values over the time period, wherein a first of the scale values at the first time is a third product of the inverse of the constant weighting factor and a preceding scale value at the second time.

3. The computer program product of claim 2, wherein the operations further comprise:
   computing a first original value as a first of the plurality of smoothed values for a first of the computing objects at a third time divided by a second of the set of scale values at the third time;
   computing a second original value as a second of the plurality of smoothed values for a second of the computing objects at the third time divided by the second of the set of scale values at the third time; and
   comparing the first original value and the second original value.

4. The computer program product of claim 2 wherein the operations further comprise periodically rescaling the set of scale values.

5. The computer program product of claim 1 wherein the operations further comprise computing the constant weighting factor as a damping level raised to a power of a difference between the first time and the second time.

6. The computer program product of claim 1, wherein the operations further comprise:
   monitoring a plurality of queues in a computer system for activity;
   detecting an event at the first time that affects a first of the plurality of queues in the computer system, wherein the first queue corresponds to the affected computing object, wherein the event does not affect a second of the plurality of queues, which corresponds to the unaffected computing object;
recording the event value for the first queue at the first time; and
storing the smoothed value for the affected computing object in a data structure indexed by an indication of the first time and an indication of the first queue, wherein the operation of setting the smoothed value for the unaffected computing object comprises storing the smoothed value for the unaffected computing object in the data structured indexed by an indication of the second queue and the first time;

wherein said the operation of using the plurality of smoothed values for computing objects over a time period in a computing application comprises,
determining relative activity of the plurality of queues based, at least in part, on the smoothed values stored in the data structure, and
allocating resources of the computer system based on the relative activity of the plurality of queues.

* * * * *